(12) United States Patent
Lackner et al.

(10) Patent No.: US 12,409,405 B2
(45) Date of Patent: Sep. 9, 2025

(54) SYSTEM AND METHOD FOR PASSIVE COLLECTION OF ATMOSPHERIC CARBON DIOXIDE WITH ENHANCED AIR FLOW

(71) Applicants: Klaus Lackner, Paradise Valley, AZ (US); Kacie Niimoto, Tempe, AZ (US); Robert Page, Phoenix, AZ (US)

(72) Inventors: Klaus Lackner, Paradise Valley, AZ (US); Kacie Niimoto, Tempe, AZ (US); Robert Page, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 403 days.

(21) Appl. No.: 18/178,261

(22) Filed: Mar. 3, 2023

(65) Prior Publication Data

US 2023/0277976 A1 Sep. 7, 2023

Related U.S. Application Data

(60) Provisional application No. 63/316,082, filed on Mar. 3, 2022.

(51) Int. Cl.
*B01D 53/04* (2006.01)
*F24S 70/60* (2018.01)

(52) U.S. Cl.
CPC ..... *B01D 53/0438* (2013.01); *B01D 53/0446* (2013.01); *F24S 70/60* (2018.05); *B01D 2257/504* (2013.01); *B01D 2258/06* (2013.01); *B01D 2259/40098* (2013.01)

(58) Field of Classification Search
CPC ............... B01D 53/04; B01D 53/0438; B01D 53/0446; B01D 53/0407; B01D 2257/504; B01D 2258/06; B01D 2259/40098; B01D 2259/40088; B01D 2259/40094;
(Continued)

(56) References Cited

U.S. PATENT DOCUMENTS 7,026,723 B2   4/2006   Moreno
7,821,151 B2   10/2010   Le et al.
10,337,504 B1   7/2019   Al-Sulaiman
(Continued)

*Primary Examiner* — Frank M Lawrence, Jr.
(74) *Attorney, Agent, or Firm* — FULLER IP LAW LLC; Rodney J. Fuller

(57) ABSTRACT

A carbon dioxide collection system having a release enclosure, a capture structure, and a chimney is disclosed. The release enclosure includes a sorbent regeneration system. The capture structure includes a sorbent material, and is movable between collection and release configurations. The chimney is shaped such that an airflow upward through the chimney is created. The chimney is positioned above the release enclosure such that the airflow passes through the capture structure while in the collection configuration. The collection configuration includes the capture structure being elevated above the release enclosure so the sorbent material is exposed to the airflow generated by the chimney, allowing the sorbent material to capture $CO_2$ from the airflow. The release configuration includes the capture structure being sufficiently enclosed inside the release enclosure that the sorbent regeneration system may operate on the sorbent material to release $CO_2$ collected by the capture structure to form an enriched fluid.

20 Claims, 14 Drawing Sheets

(58) Field of Classification Search
CPC ........... B01D 2259/40096; Y02C 20/40; F24S 70/60; F24S 70/30
USPC .......... 423/230; 96/121, 123, 126, 143, 150; 95/107, 139
See application file for complete search history.

(56) References Cited

U.S. PATENT DOCUMENTS

| | | | |
|---|---|---|---|
| 11,389,761 B1* | 7/2022 | Stark, Jr. ................ | B01D 53/82 |
| 12,303,824 B2* | 5/2025 | Lackner ................. | B01D 53/06 |
| 2012/0174793 A1* | 7/2012 | Eisenberger ....... | B01D 53/0407 |
| | | | 96/145 |
| 2015/0273385 A1* | 10/2015 | Eisenberger .......... | B01D 53/08 |
| | | | 95/107 |
| 2023/0036635 A1* | 2/2023 | Santos-Heard ......... | B01J 20/20 |
| 2023/0211278 A1* | 7/2023 | Eisenberger .......... | B01D 53/02 |
| | | | 95/139 |
| 2024/0091698 A1* | 3/2024 | Lackner ............. | B01D 53/0454 |

* cited by examiner

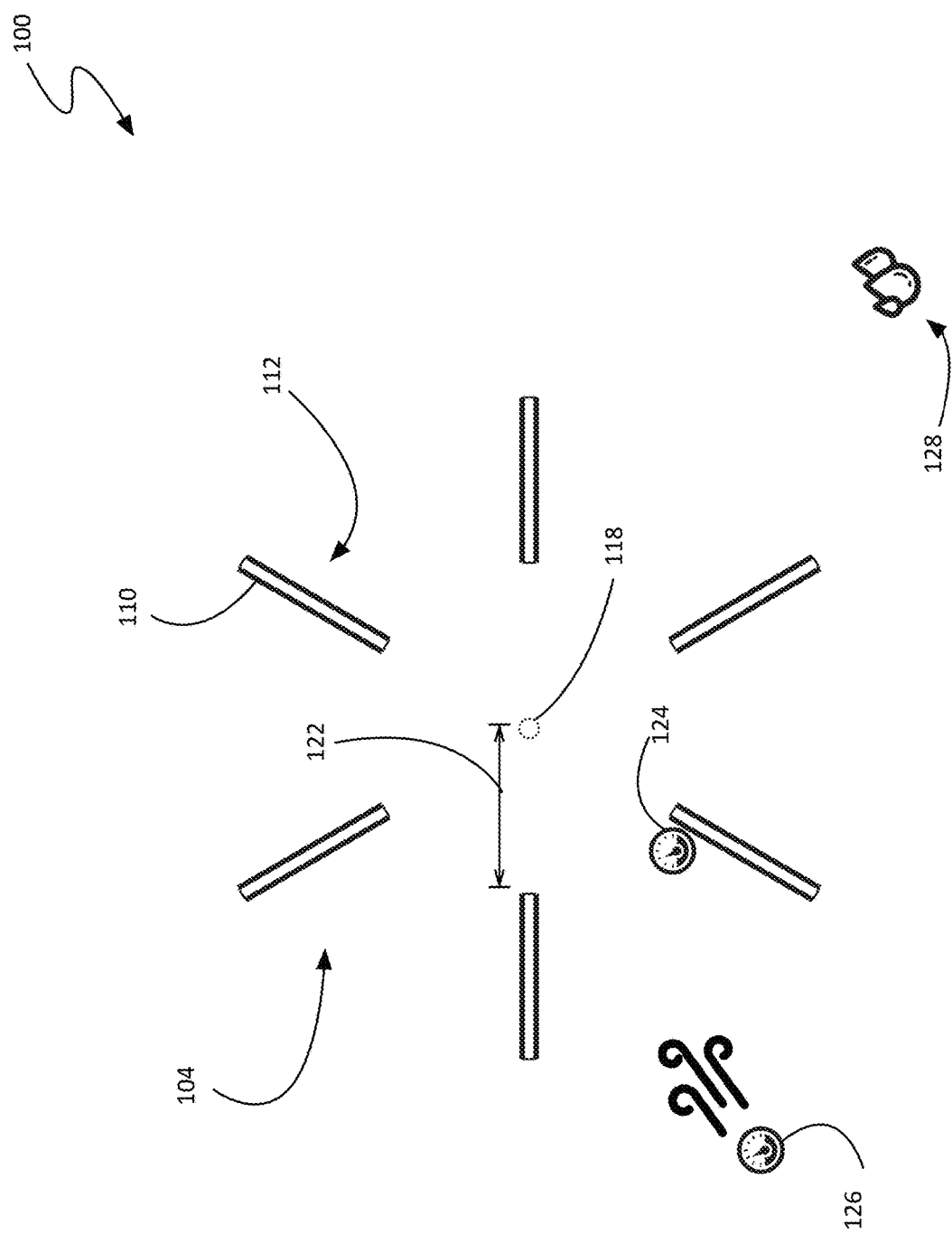

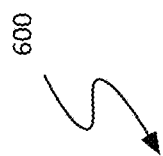
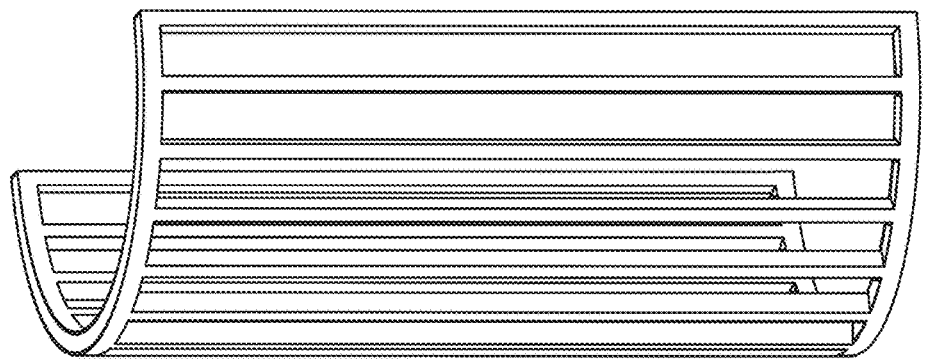
FIG. 6

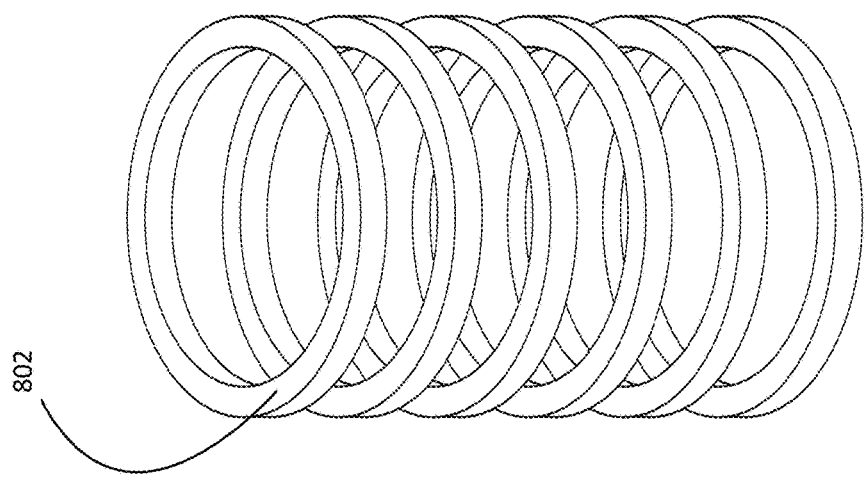
FIG. 8

SYSTEM AND METHOD FOR PASSIVE COLLECTION OF ATMOSPHERIC CARBON DIOXIDE WITH ENHANCED AIR FLOW

RELATED APPLICATIONS

This application claims the benefit of U.S. provisional patent application No. 63/316,082, filed Mar. 3, 2022, titled "System and Method for Passive Collection of Atmospheric Carbon Dioxide with Enhanced Air Flow," the entirety of the disclosure of which is hereby incorporated by this reference.

TECHNICAL FIELD

Aspects of this document relate generally to the collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with a carbon dioxide ($CO_2$) storage technology, air capture of $CO_2$ could compensate for $CO_2$ emissions from any source, without requiring changes to the existing infrastructure and without requiring proximity to the point of emission. Air capture technology makes it possible for existing infrastructures to live out their natural life spans, and it permits the continued use of carbon-based fuels in distributed and mobile applications, for example in the transportation sector. With air capture technology, it is possible to continue the use of liquid hydrocarbon fuels while eliminating their climate impact.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is direct air capture, or DAC. There exist two types of DAC regarding airflow; active, which uses large fans to bring the $CO_2$ to the sorbents, and passive, which takes advantage of natural air currents like wind. The current capture cost of DAC (500-600 USD/ton $CO_2$) is too expensive, mainly due to operational expenses. Although the distinct costs associated with active capture (e.g., the operation of fans, etc.) are presumably low, the costs are relatively fixed since fan technology has probably reached its technical limit. On the other hand, passive DAC devices can have lower operating expenses but tend to have a larger cross-sectional area than active devices, since they need to expose a larger surface area of sorbent to compensate for the intermittent nature of ambient air flows.

Direct air capture generally constitutes both $CO_2$ capture and its release. The release process is considered the primary economic limiting factor, driven by either temperature, pressure, moisture, electrochemical gradient, or combination of these drivers. In particular, the moisture-swing process requires relatively minor amounts of energy, in which the energy to release the $CO_2$ is the latent heat of the water. However, this process consumes significant amounts of water relative to the capture tonnage.

The limitations of active capture (i.e., fan driven capture) is the cost of the fans and motors and their operational cost. The limitation of passive capture is the cost of the required increase in surface area of exposed sorbent. The benefits of each method come at a cost.

SUMMARY

According to one aspect, a carbon dioxide collection system includes a release enclosure having an opening and a sorbent regeneration system. The system also includes a capture structure having a plurality of vertical panels oriented radially about a central axis of the capture structure, with each vertical panel having a sorbent material. The capture structure is movable between a collection configuration and a release configuration. The system includes a chimney having a hyperboloid structure and shaped such that an airflow upward through the chimney is created, with the chimney positioned above the release enclosure such that the airflow passes through the capture structure before exiting the chimney while the capture structure is in the collection configuration. The chimney has a heating material configured to absorb solar radiation such that an air temperature inside the chimney is greater than an ambient air temperature outside the chimney. The system also includes at least one solar panel coupled to the chimney, and a product outlet in fluid communication with the inside of the release enclosure and configured to emit a product stream of enriched fluid. The collection configuration includes the capture structure being elevated above the release enclosure such that the sorbent material of the capture structure is exposed to the airflow generated by the chimney, allowing the sorbent material to capture carbon dioxide from the airflow. The release configuration includes the capture structure being sufficiently enclosed inside the release enclosure that the sorbent regeneration system may operate on the sorbent material of the capture structure to release carbon dioxide collected by the capture structure while in the collection configuration to form an enriched fluid within the release enclosure.

Particular embodiments may comprise one or more of the following features. The collection configuration may include at least one of the capture structure being separated from the chimney by at least a vertical separation and/or the sorbent material of the capture structure being distanced from a central axis of the capture structure by at least a radius. At least one of the vertical separation and the radius may be chosen such that a $CO_2$ capture rate of the sorbent material as arranged in the capture structure is substantially equal to a $CO_2$ exposure rate caused by the airflow passing through the capture structure while the capture structure is in the collection configuration. The at least one of the radius and the vertical separation may be able to be modified after the carbon dioxide collection system has been installed, in response to a change in an environmental condition. The release enclosure may further include a lid sized to cover the opening and configured to seal the capture structure inside the release enclosure when in the release configuration. The chimney may be one of a cooling tower and a smokestack. The chimney may include a dynamic geometry such that at least one of a height of the chimney and a width of the chimney may be modified after manufacture. The heating material may be confined to an upper portion of the chimney such that the upper portion absorbs more solar radiation than a lower portion of the chimney, thereby creating a thermal gradient to enhance the airflow through the chimney. The collection configuration may include the capture structure being at least partially inside of the chimney.

According to another aspect of the disclosure, a carbon dioxide collection system includes a release enclosure having an opening and a sorbent regeneration system. The system also includes a capture structure having a sorbent material. The capture structure is movable between a collection configuration and a release configuration. The system includes a chimney shaped such that an airflow upward through the chimney is created, with the chimney positioned above the release enclosure such that the airflow passes through the capture structure before exiting the chimney while the capture structure is in the collection configuration. The system also includes a product outlet in fluid communication with the inside of the release enclosure and configured to emit a product stream of enriched fluid. The collection configuration includes the capture structure being elevated above the release enclosure such that the sorbent material of the capture structure is exposed to the airflow generated by the chimney, allowing the sorbent material to capture carbon dioxide from the airflow. The release configuration includes the capture structure being sufficiently enclosed inside the release enclosure that the sorbent regeneration system may operate on the sorbent material of the capture structure to release carbon dioxide collected by the capture structure while in the collection configuration to form an enriched fluid within the release enclosure.

Particular embodiments may comprise one or more of the following features. The capture structure may include a plurality of vertical panels oriented radially about a central axis of the capture structure. Each vertical panel may include the sorbent material. The collection configuration may include at least one of the capture structure being separated from the chimney by at least a vertical separation and the sorbent material of the capture structure being distanced from a central axis of the capture structure by at least a radius. At least one of the vertical separation and the radius may be chosen such that a $CO_2$ capture rate of the sorbent material as arranged in the capture structure is substantially equal to a $CO_2$ exposure rate caused by the airflow passing through the capture structure while the capture structure is in the collection configuration. The at least one of the radius and the vertical separation may be able to be modified after the carbon dioxide collection system has been installed, in response to a change in an environmental condition. The release enclosure may further include a lid sized to cover the opening and configured to seal the capture structure inside the release enclosure when in the release configuration. At least one solar panel may be coupled to the chimney. The chimney may be one of a cooling tower and a smokestack. The chimney may be a hyperboloid structure. The chimney may include a dynamic geometry such that at least one of a height of the chimney and a width of the chimney may be modified after manufacture. The chimney may include a heating material configured to absorb solar radiation such that an air temperature inside the chimney may be greater than an ambient air temperature outside the chimney. The heating material may be confined to an upper portion of the chimney such that the upper portion absorbs more solar radiation than a lower portion of the chimney, thereby creating a thermal gradient to enhance the airflow through the chimney. The collection configuration may include the capture structure being at least partially inside of the chimney.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 1A-1C are perspective, side, and cross-sectional views of a carbon dioxide collection system with enhanced air flow, respectively;

FIG. 6 is a front view of a portion of a capture structure without sorbent material;

FIG. 8 is a perspective view of a capture structure with a plurality of rings;

DETAILED DESCRIPTION

Figure 1A:
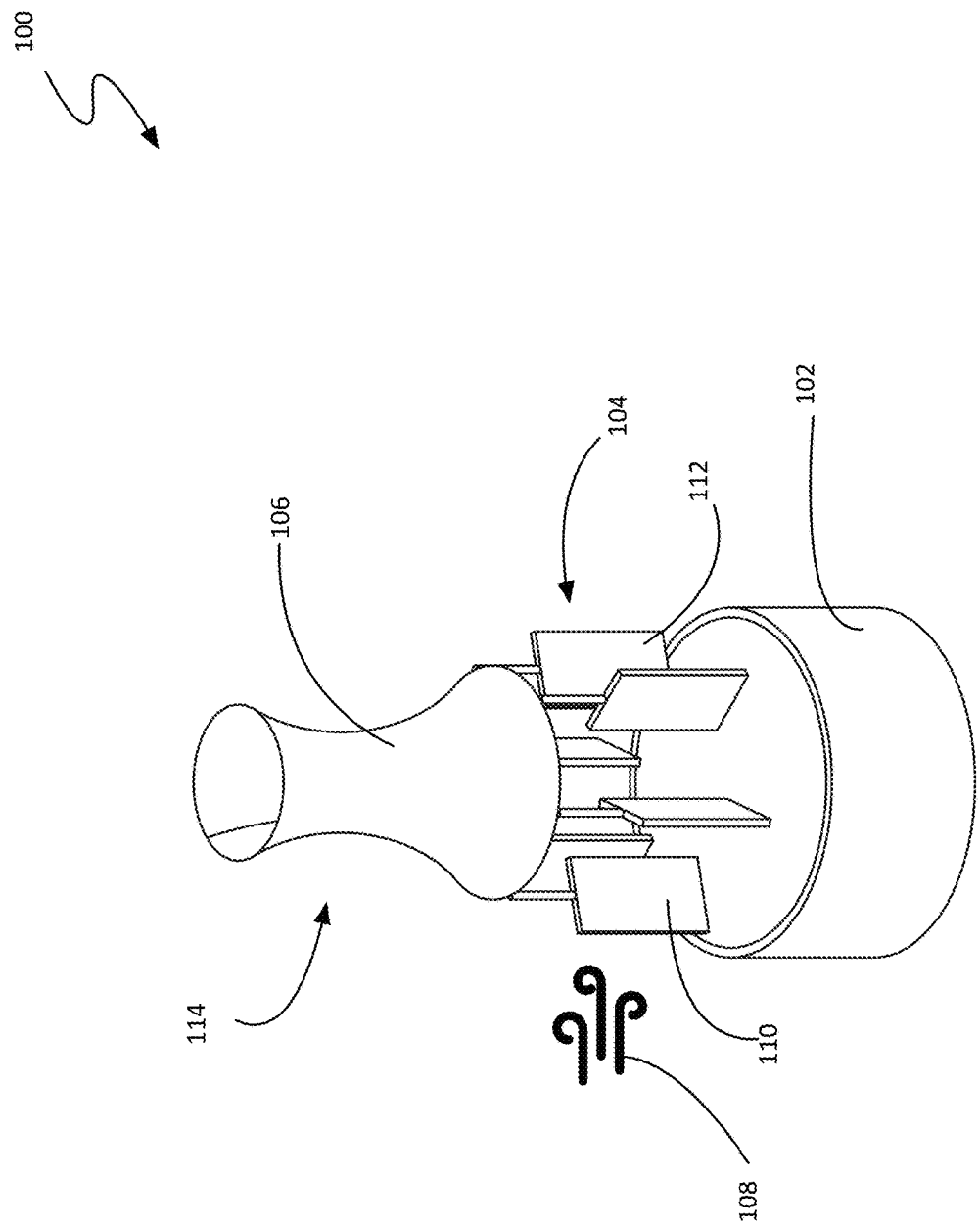

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with a carbon dioxide ($CO_2$) storage technology, air capture of $CO_2$ could compensate for $CO_2$ emissions from any source, without requiring changes to the existing infrastructure and without requiring proximity to the point of emission. Air capture technology makes it possible for existing infrastructures to live out their natural life spans, and it permits the continued use of carbon-based fuels in distributed and mobile applications, for example in the transportation sector. With air capture technology, it is possible to continue the use of liquid hydrocarbon fuels while eliminating their climate impact.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is direct air capture, or DAC. There exist two types of DAC regarding airflow; active, which uses large fans to bring the $CO_2$ to the sorbents, and passive, which takes advantage of natural air currents like wind. The current capture cost of DAC (500-600 USD/ton $CO_2$) is too expensive, mainly due to operational expenses. Although the distinct costs associated with active capture (e.g., the operation of fans, etc.) are presumably low, the costs are relatively fixed since fan technology has probably reached its technical limit. On the other hand, passive DAC devices can have lower operating expenses but tend to have a larger cross-sectional area than active devices, since they need to expose a larger surface area of sorbent to compensate for the intermittent nature of ambient air flows.

Direct air capture generally constitutes both $CO_2$ capture and its release. The release process is considered the primary economic limiting factor, driven by either a temperature, pressure, moisture, electrochemical gradient, or combination. In particular, the moisture-swing process requires relatively minor amounts of energy, in which the energy to release the $CO_2$ is the latent heat of the water. However, this process consumes significant amounts of water relative to the capture tonnage.

The limitations of active capture (i.e., fan driven capture) is the cost of the fans and motors and their operational cost. The limitation of passive capture is the cost of the required increase in surface area of exposed sorbent. The benefits of each method come at a cost.

Contemplated herein are systems and methods for passive carbon dioxide collection using an enhanced air flow. The system contemplated herein provides the benefits of conventional passive and active DAC technology without the high cost of active air movers or the low output of natural airflows. The contemplated $CO_2$ collection systems include a chimney or tower as an architectural addition that is able to harness the chimney or stack effect and provide an enhanced airflow, without requiring fans or other air moving devices. The chimney effect allows for more rapid $CO_2$ uptake without incurring the costs of an active system. With proper placement of the sorbent material, this chimney effect airflow will increase the airflow across the sorbent, as well as make it less intermittent, thus increasing the capture of $CO_2$ per unit time. While the chimney would add a modest upfront capital cost, it is able to function without additional operating costs, thus removing the operational expense that hinders the development of active capture devices. According to various embodiments, the contemplated system can achieve the absorption speed of an active system while having the operating costs of a passive system.

The contemplated passive DAC system (hereinafter "chimney DAC system" or simply "system") and method contemplated herein has the potential to disrupt the existing DAC technologies. Application of the chimney-like structure and careful attention to its details (e.g., shape, material, color, sorbent properties, sorbent placement, flow patterns, solar heating, etc.) enhances the limited airflow within an otherwise passive DAC setup, while avoiding the energy costs associated with active capture.

The contemplated systems and methods offer numerous advantages over conventional DAC systems, both passive and active. The chimney effect provides increased airflow compared to passive DAC technology, permitting the use of sorbent materials having faster collection rates than would be practical in passive systems. According to various embodiments, the system uses less energy per ton of captured $CO_2$ than devices that employ fans or other mechanical means to actively move air.

According to various embodiments, the contemplated system may provide additional energy savings and performance boosts by harnessing natural heating (e.g., solar, geothermal, etc.). In some embodiments, the materials used in the chimney and/or outer coatings or solar devices may facilitate solar heating. This heat may be used to enhance the operation of a sorbent regeneration system, and may also be used to enhance the airflow through the chimney, as will be discussed in greater detail, below.

The chimney also provides an advantageous platform on which solar panels may be mounted. Utilizing the vertical scale of the chimney, solar power can be used to operate the system without substantially increasing its footprint, permitting multiple systems to be positioned closer to each other than otherwise possible.

The contemplated system is also advantageous over conventional DAC systems, particularly active DAC systems, because it has few moving parts, reducing the need for maintenance and increasing operational safety without sacrificing performance. In some embodiments, the system may be automated, allowing for minimal staffing and further reducing operational costs. Remote monitoring and metering can provide certifiable proof of capture for either disposal or carbon re-use, according to various embodiments.

Figure 1B:
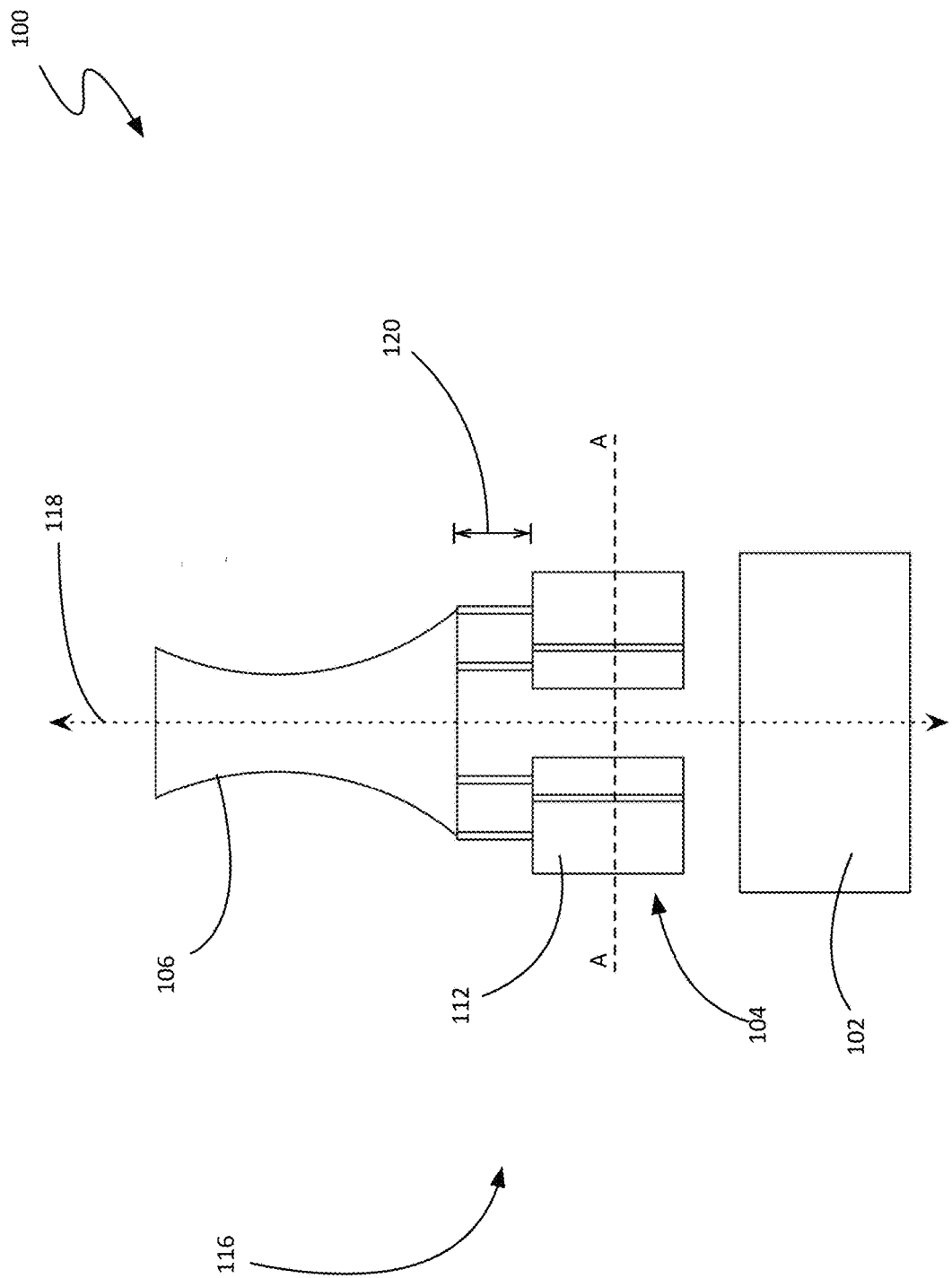

FIGS. 1A-1C are perspective, side, and cross-sectional views of a non-limiting example of a carbon dioxide collection system 100 with enhanced air flow. As shown, the system 100 comprises a chimney 106, a capture structure 104, and a release enclosure 102. According to various embodiments, the chimney 106 causes the creation of an airflow 108 which is used to expose the capture structure 104 to a large volume of atmosphere before being regenerated in the release enclosure 102. Each element will be discussed in greater detail below.

In the context of the present description and the claims that follow, a capture structure 104 is a structure that comprises a sorbent material 110, and is configured to expose that sorbent material 110 to an airflow 108 containing carbon dioxide 218. The capture structure 104 provides a structure or framework to position the sorbent material 110 used to capture, and subsequently release, atmospheric carbon dioxide 218, in an arrangement conducive for these two activities. The capture structure 104 is movable between a collection configuration 116 and a release configuration 208.

The capture structure 104 shown in FIGS. 1A-1C is in the collection configuration 116. These configurations will be discussed further in the context of FIGS. 2A and 2B, below.

According to various embodiments, the contemplated system 100 may be adapted for use in a wide range of environments, using a variety of sorbent materials 110 and capture structures 104 that meet the needs of a particular location. In some embodiments, including the non-limiting example shown in FIGS. 1A-1C, the capture structure 104 may comprise a plurality of vertical panels 112 (i.e., larger vertically than in either horizontal direction), each vertical panel 112 comprising a sorbent material 110. In some embodiments, these vertical panels 112 are oriented radially about a central axis 118 of the capture structure 104, such that they are pointing away from the central axis 118.

It should be noted that the plurality of radially-oriented vertical panels 112 described above and shown in FIGS. 1A-1C are but one of a wide range of capture structures 104 that may be used with the contemplated system 100. In some embodiments, the sorbent material 110 of the capture structure 104 may have rotational symmetry about the central axis 118, while in other embodiments the sorbent material 110 may be distributed across the capture structure 104 unevenly. In some embodiments the capture structure 104 may be a single structure, while in other embodiments the capture structure 104 may comprise a plurality of segments or components that are able to move independently. In some embodiments, the capture structure 104 may employ solid sorbent material 110 while in others it may use liquids.

In some embodiments the sorbent material 110 may be releasably coupled to the capture structure 104, able to be replaced or swapped with a different sorbent material 110. In other embodiments, the sorbent material 110 may be integral with the capture structure 104. In some embodiments, the capture structure 104 and its sorbent material 110 may be configured to collect carbon dioxide 218 as the airflow 108 created by the chimney 106 passes over an outer surface of the sorbent material 110. In other embodiments, the capture structure 104 and sorbent material 110 may be configured such that atmospheric carbon dioxide 218 is collected from the airflow 108 as it passes through the sorbent material 110. Additional variations of the capture structure 104 will be discussed below.

The system 100 also comprises a release enclosure 102. In the context of the present description and the claims that follow, a release enclosure 102 is a volume within which the sorbent material 110 of the capture structure 104 may be regenerated, causing the captured carbon dioxide 218 to be released into the enclosure 102, where it will be extracted for downstream storage, refinement, and/or use. According to various embodiments, the release enclosure 102 comprises a sorbent regeneration system, which is able to cause the sorbent material 110 of the capture structure 104 to release captured $CO_2$ for harvest, preparing the sorbent material 110 for another cycle of capture and release. In some embodiments, the release enclosure 102 may also comprise an opening 204 through which at least a portion of the capture structure 104 may be lowered to regenerate the sorbent material 110. In some embodiments, the release enclosure 102 may further comprise a lid 206 or other means by which the enclosure may be sealed. The release enclosure 102, the sorbent regeneration system, and the opening will all be discussed in greater detail with respect to FIGS. 2A and 2B, below.

The system 100 also comprises a tower or chimney 106. In the context of the present description and the claims that follow, a chimney 106 is a conduit sized and shaped such that an airflow 108 is induced upward through said conduit by the stack effect or chimney effect. A pressure differential between the air inside the chimney 106 and outside the chimney 106 causes this airflow 108. In some cases, this pressure differential may be generated by an air speed differential imposed by wind flow. In other cases, the airflow 108 may be caused by a temperature differential between the air inside the chimney 106 and outside the chimney 106, or even a thermal gradient within the chimney 106.

According to various embodiments, the chimney 106 is positioned such that the resulting airflow 108 passes through the capture structure 104 before exiting the chimney 106 while the capture structure 104 is in the collection configuration 116. In some embodiments, the chimney 106 is positioned above the release enclosure 102, such that the capture structure 104 may simply be raised up from and lowered down into the release enclosure 102 as it moves between the collection and release configurations. In other embodiments, the release enclosure 102 may be located elsewhere, or may even be intermittent, temporarily forming for regeneration and harvest, then breaking apart for collection.

A shape common to cooling towers is the hyperboloid, specifically a single sheet hyperboloid. The hyperboloid shape provides good structural strength using a minimal amount of building material. These shapes also advantageously accelerate the airflow 108 upward as it passes through the narrowed waist. According to various embodiments, the chimney 106 design can acknowledge and adjust for a number of variables including, but not limited to, system dimensions, location, and supporting structures. For example, the chimney 106 may be a hyperboloid structure 114 (i.e., having a hyperboloid shape), may be placed on the side of a hill, may use an underground/above ground combination for an additional temperature-driven effects, and the like.

According to various embodiments, the chimney 106 may have a circular cross-section, allowing capture to be "the same" regardless of the direction of the wind or other environmental air flow. Circular design for the chimney 106 makes the system 100 agnostic to directional consideration and uses the structural shape most consistent with strength for a raised element. However, other embodiments may employ a chimney 106 with a cross-section having a lower order of symmetry.

Figure 2A:
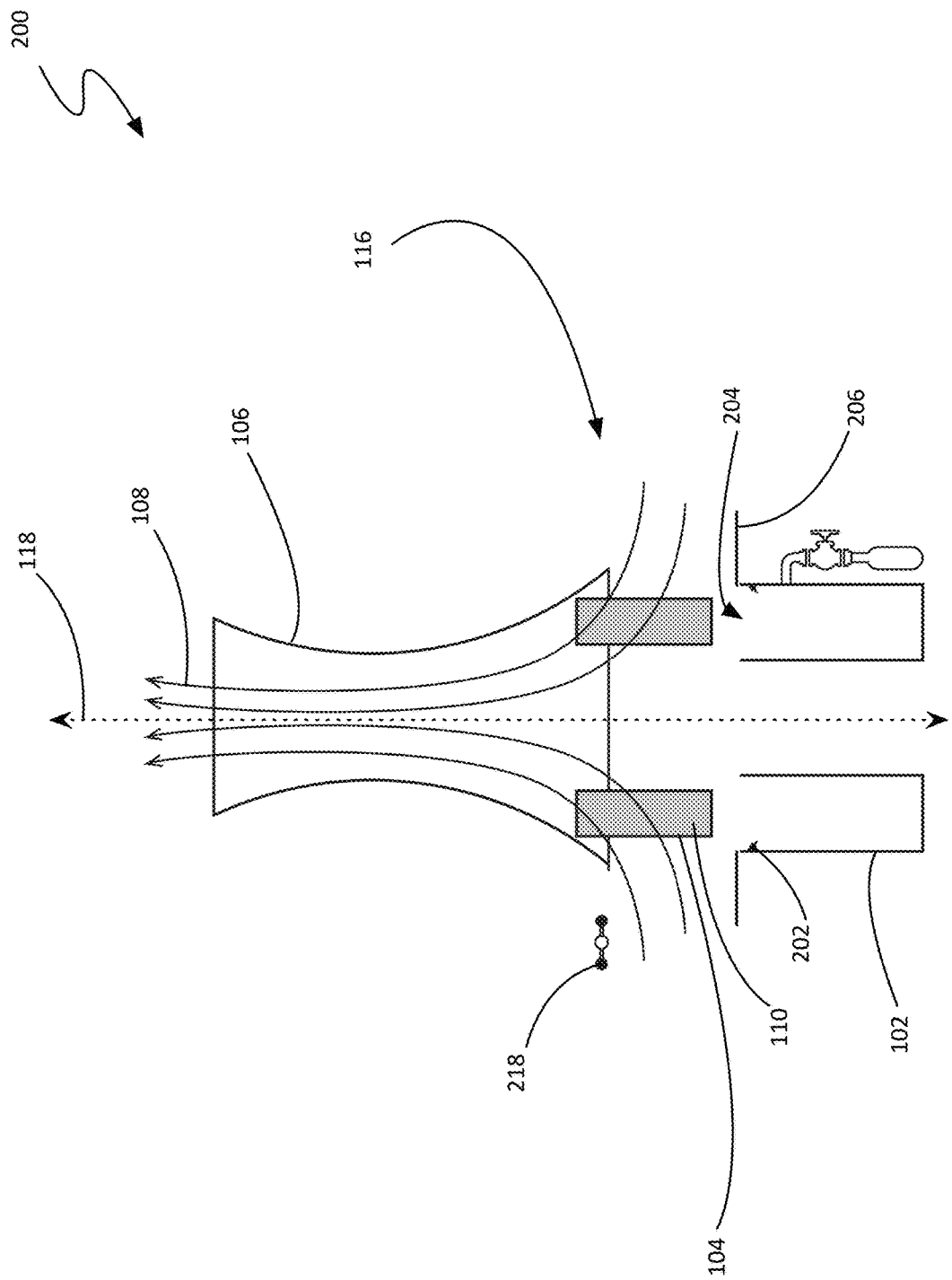
FIGS. 2A and 2B are cross-sectional views of a carbon dioxide collection system with a capture structure in the collection and release configurations, respectively.

The ideal position for the chimney 106, relative to the capture structure 104 when in the collection configuration 116, depends upon the induced airflow 108. According to various embodiments, the chimney 106 is positioned such that the airflow 108 passes through the capture structure 104 while in the collection configuration 116. In some embodiments, the capture structure 104 in the collection configuration 116 may be below the chimney 106, as shown in FIGS. 1A-1C. As an option, in some cases, the capture structure 104 may surround that area below the chimney 106. In other embodiments, the capture structure 104 in the collection configuration 116 may be, at least partially, inside of the chimney 106, as shown in FIG. 2A.

Ideally, the system 100 should be balanced such that the rate at which it is able to capture carbon dioxide 218 (i.e., $CO_2$ capture rate 124) is equal to or substantially equal to the rate at which $CO_2$ is passing through the capture structure 104 inside the induced airflow 108 while the capture structure 104 is in the collection configuration 116 (i.e., $CO_2$ exposure rate 126). The chimney 106 geometry and scale, and the capture structure 104 geometry and scale, are preferably chosen to expose the sorbent material 110 as effectively as possible to the airflow 108 during capture and the regeneration media while in the release enclosure 102. Moving air through the structure faster than the $CO_2$ can be captured is wasted energy, and moving it too slow is wasted potential.

Flow rate also should take into account the specific geometry of the capture structure 104. For example, in one embodiment having vertical panels 112 of sorbent material 110 oriented radially away from a central axis 118, the geometry of the capture structure 104 should be chosen such that the sorbent material 110 at the backend of the airflow 108 gets exposure for maximized capture during the cycle time.

The $CO_2$ capture rate 124 is mainly influenced by the sorbent material 110 being used, as well as ambient environmental conditions 128, as they pertain to the "swing" of that particular sorbent material 110 (e.g., humidity, rain, temperature, etc.). The $CO_2$ exposure rate 126 is mainly influenced by the geometry of the chimney 106 as well as the geometry and position of the capture structure 104, relative to the chimney 106. According to various embodiments, these two rates may be tuned to be substantially equal through modification of one or both of the structures and/or the sorbent material 110 used.

According to various embodiments, the geometry of the capture structure 104 may be chosen such that, for a given chimney 106 and resulting airflow 108 as well as a sorbent material 110 chosen for the intended environment using the available resources, the $CO_2$ capture rate 124 (i.e., $CO_2$ captured by capture structure 104 per unit time) due to that sorbent material 110 and how it is arranged in the capture structure 104 is substantially equal to the $CO_2$ exposure rate 126 (i.e. $CO_2$ passing through and contacting the capture structure 104 per unit time) caused by the airflow 108 and the overall size of the capture structure 104. Overall, modifying the distance of the capture structure 104 in the collection configuration 116 from the chimney 106 can help balance these rates. The further away from the chimney 106, the lower the pressure drop, and the lower the speed of airflow 108.

As a specific, non-limiting example, in some embodiments the collection configuration 116 comprises at least one of the capture structure 104 being separated from the chimney 106 by at least a vertical separation 120 (e.g., the vertical separation between the top of the capture structure 104 and the bottom of the chimney 106, etc.) and the sorbent material 110 of the capture structure 104 being distanced from a central axis 118 of the capture structure 104 by at least a radius 122. See, for example, the side view of the system 100 shown in FIG. 1B and the cross-section taken along A-A of FIG. 1B, shown in FIG. 1C. According to various embodiments, at least one of the vertical separation 120 and the radius 122 may be chosen such that the $CO_2$ capture rate 124 of the sorbent material 110 as arranged in the capture structure 104 is substantially equal to the $CO_2$ exposure rate 126 caused by the airflow 108 passing through the capture structure 104 while the capture structure 104 is in the collection configuration 116. It may be easier to fine tune the balance between exposure and capture through modifying one or more of these distances, as changes in the choice of sorbent material 110 may modify that balance too drastically for a particular installation.

In some embodiments, manipulating the distance between the capture structure 104 (or more specifically, the sorbent material 110 of the capture structure 104) and the chimney 106 may be used to balance the exposure and capture rates at the time of installation of the system 100. In other embodiments, the capture structure 104 may be configured such that at least one of said distances may be changed after installation of the system 100. For example, in one embodiment, the relative position of the capture structure 104 with respect to the chimney 106 may be changeable through a mechanism (e.g., hydraulics, linear actuator, winch, etc.), allowing the system 100 to adapt to a change in an environmental condition 128. Examples of a change in an environmental condition 128 include, but are not limited to, changes in weather (e.g., temperature, humidity, cloud cover, rain, wind, etc.), changes in consumables (e.g., introduction of a contaminant to a regeneration media, etc.), and the like. In some embodiments, the system 100 may be configured to detect a change in an environmental condition 128 and automatically modify the geometry of the capture structure 104 in response, to maintain efficiency.

According to various embodiments, the system 100 may comprise other sub-systems not shown in FIGS. 1A-1C including, but not limited to, one or more product outlets and outflow piping for obtaining a product stream (e.g., $CO_2$-enriched air or other gas, $CO_2$-enriched liquid, etc.), a control system, sensors, mechanisms for moving the capture structure 104 between the collection and release configurations (e.g., lifts, cranes, actuators, etc.). In some embodiments where the regeneration of the sorbent material 110 requires the use of a limited regeneration media such as clean water, the system 100 may be coupled to a source of replacement media. In some embodiments the system 100 may be self-powered by on-board solar cells, wind turbines, hydroelectric generators, and the like. In other embodiments, the system 100 may be coupled to external power sources. In some embodiments, the system 100 may also be coupled to infrastructure for the downstream handling of the product stream (e.g., purification, storage, use as feedstock, compression, etc.).

Figure 2B:
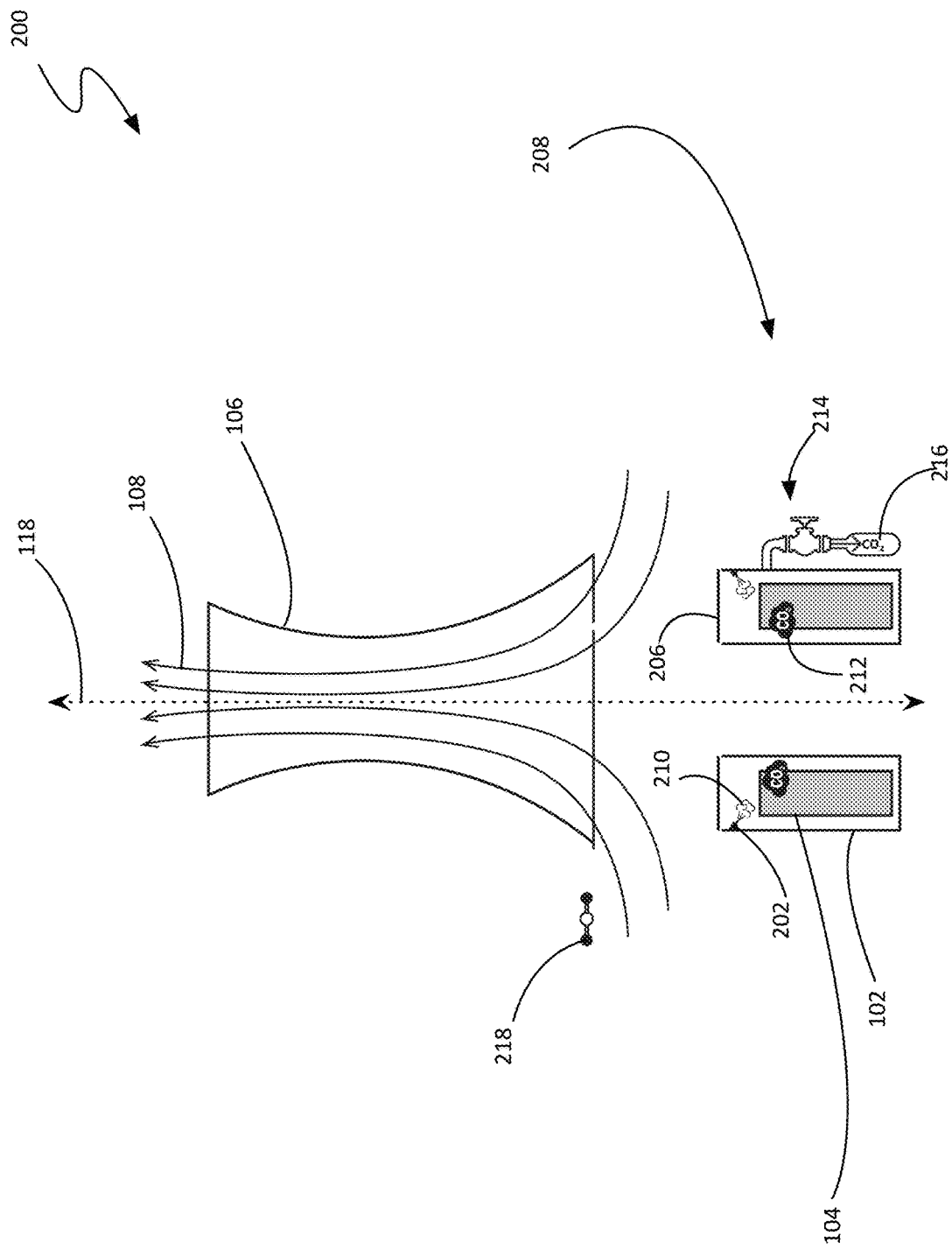

FIGS. 2A and 2B are cross-sectional views taken along the central axis 118 of a non-limiting example of an embodiment of the contemplated carbon dioxide collection system 200, with a capture structure 104 in the collection and release configurations, respectively. As shown, the release enclosure 102 comprises a sorbent regeneration system 202 and an opening 204 sized to receive at least a majority of the capture structure 104 (e.g., in an embodiment where the regeneration media 210 is liquid water, the entire capture structure 104 would not have to be submerged, just the sorbent material 110).

According to various embodiments, the contemplated systems operate by cycling between collection and release phases. According to various embodiments, the capture structure 104 has a release configuration 208 and a collection configuration 116. In the context of the present description and the claims that follow, a collection configuration 116 is an arrangement of the capture structure 104 such that the sorbent material 110 is exposed to an airflow 108 (i.e., the airflow 108 generated by the chimney 106), allowing the sorbent material 110 to capture carbon dioxide 218 from the airflow 108. As shown in FIG. 2A, in which the capture structure 104 is in the collection configuration 116, the capture structure 104 is elevated above the release enclosure 102.

In some embodiments, the release enclosure 102 may be positioned directly beneath the capture structure 104 such that at least the portion of the capture structure 104 comprising the sorbent material 110 may be lowered into the enclosure for harvesting. In other embodiments, the release enclosure 102 may be located elsewhere. A particular embodiment, where the release enclosure 102 is intermittent, will be discussed with respect to FIG. 11, below.

In some embodiments, the release enclosure 102 may be a single container or basin, able to receive all of the sorbent material 110 of the capture structure 104. See, for example, the release enclosure 102 shown in FIGS. 1A-1B. In other embodiments, the release enclosure 102 may be partitioned into segments that may more closely fit a segmented geometry of some embodiments of the capture structure 104, thereby reducing the overall volume contained within the release enclosure 102 and reducing wasted regeneration media 210 (e.g., thermal energy, water, energy needed to reduce pressure, etc.). As a specific, non-limiting example, the capture structure 104 shown in FIGS. 1A-1C comprises six vertical panels 112, each having sorbent material 110. In one embodiment (not shown), each of those six vertical panels 112 may have a single-panel-sized vessel into which it is lowered, minimizing the total volume of the release enclosure 102 while still able to regenerate the entire capture structure 104 at the same time.

In some embodiments where the release enclosure 102 comprises a plurality of vessels, the vessels may be in fluid communication with each other, facilitating the dispensing of regeneration media 210 and the extraction of a product stream 216 of $CO_2$-enriched fluid 212. In other embodiments, each vessel may be in fluid communication with the sorbent regeneration system 202 and a product outlet 214 without being directly connected to other vessels. In some embodiments, a compromise between these two extremes may be a preferred approach.

The release enclosure 102 shown in FIGS. 2A and 2B is also a single vessel, in this case ring shaped. The ring shape results in a release enclosure 102 volume that is smaller than that of FIG. 1A, but using a single vessel provides advantages when the enriched fluid 212 is a gas that is being removed using a sweep gas, for example.

In some embodiments, the sorbent material 110 remains outside of the chimney 106 in both the collection configuration 116 and the release configuration 208. In other embodiments, including the non-limiting example shown in FIG. 2A, the collection configuration 116 may comprise the capture structure 104 being at least partially inside of the chimney 106. As previously discussed, the efficiency of the system may be tuned through changing the distance between the capture structure 104 and the chimney 106. As an added bonus, placing at least part of the capture structure 104 inside the chimney 106 while in the collection configuration 116 may provide protection for the sorbent material 110, which is sometimes fragile.

Once an adequate amount of $CO_2$ is collected, the capture structure 104 moves into the release configuration 208, where at least a portion of the capture structure 104 comprising the now $CO_2$-laden sorbent material 110 is placed inside the release enclosure 102. In the context of the present description and the claims that follow, a release configuration 208 comprises the capture structure 104 being sufficiently enclosed inside the release enclosure 102 that the regeneration media 210 of the sorbent regeneration system 202 may operate on the sorbent material 110 of the capture structure 104 to release carbon dioxide 218 collected by the capture structure 104 while in the collection configuration 116 to form an enriched fluid 212 within the release enclosure 102.

The regeneration media 210 will vary depending on the nature of the sorbent material 110 used. Examples include, but are not limited to, liquid, vapor, gas, heat, vacuum or reduced pressure, electricity, water, microwaves, and the like. Exposure to the regeneration media 210 will cause the captured carbon dioxide 218 to be released into the release enclosure 102. In some embodiments, the carbon dioxide 218 is released into the regeneration media 210, where it may be stored. If the regeneration media 210 can retain the carbon dioxide 218 released by the sorbent material 110, in ambient conditions, the release enclosure 102 may remain open and may not require a lid 206 or be otherwise sealed.

In some embodiments, the release enclosure 102 may comprise an opening 204 through which at least a portion of the capture structure 104 may be lowered to regenerate the sorbent material 110. In some embodiments, the release enclosure 102 may further comprise a lid 206 sized to cover the opening 204 and configured to seal the capture structure 104 inside the release enclosure 102 when in the release configuration 208. Such a sealing would prevent or significantly reduce the amount of released carbon dioxide 218 and/or regeneration media 210 (e.g., steam, low pressure environment, heat, moisture, etc.) from escaping. In other embodiments, the release enclosure 102 may remain open, and rely on a sorbent regeneration system 202 that is not disrupted by exposure to the atmosphere (e.g., submerging the sorbent in a liquid and releasing the captured $CO_2$ as dissolved inorganic carbon, etc.).

The carbon dioxide 218 is then removed from the release enclosure 102 through a product outlet 214 as a product stream 216 of enriched fluid 212 (e.g., $CO_2$-enriched air or other gas, $CO_2$-enriched liquid, etc.). The product outlet 214 is in fluid communication with the inside of the release enclosure 102. This product stream 216 may then move on to downstream processing and/or use. After the sorbent regeneration is complete and there is no danger of losing meaningful amounts of collected $CO_2$, the capture structure 104 moves back into the collection configuration 116 and the process begins again. In other embodiments, the system may operate in a continuous fashion, collecting carbon dioxide 218 and producing a product stream 216 simultaneously. This will be discussed in greater detail with respect to FIG. 9, below.

The chimney effect may be achieved with a variety of conduit geometries. This advantageously allows the chimney 106 of the contemplated system 100 to be adapted to take advantage of aspects of the location where it will be deployed and the environment in which it will operate (e.g., temperature, airflow, sun exposure, etc.). For example, a chimney 106 may be modified to operate on a hillside.

In some embodiments, the chimney 106 may be manufactured specifically for the contemplated system 100. In other embodiments, the system 100 may repurpose conduits built for other purposes. For example, in one embodiment, old cooling towers and smokestacks may be retrofit for use as part of a carbon dioxide collection system 100 with enhanced airflow. In another embodiment, the cooling tower of a HVAC system may be leveraged for creating an enhanced airflow 108. In still other embodiments, the system 100 contemplated herein may be integrated with cooling towers, smokestacks, and the like that are still in active use. As an option, the system 100 may be integrated to harness aspects of these active industrial systems (e.g., using waste heat to enhance a temperature differential and improve airflow 108, utilize infrastructure already present such as water and electricity, etc.). Those skilled in the art will recognize that the chimney effect has been utilized in a wide range of industries and technologies, presenting numerous opportunities for repurposing chimneys and towers for the task of capturing atmospheric carbon dioxide 218.

One of the advantages of the contemplated system 100 is that it may be implemented across a wide range of scales. In some embodiments, the chimney 106 may be sized such that it may be mass-produced in a factory, and transported to the installation site on a tractor trailer without requiring special permits. Other embodiments may be the size of a shipping container. The ability to mass produce the chimney 106 inside a factory minimizes the cost, improves the quality, and facilitates rapid worldwide distribution. The ability to scale the system 100 small also opens a wide range of locations and applications.

Of course, in other embodiments, the chimney 106 may be too large to manufacture off-site. However, geometries may be employed that reduce the cost and complexity of an on-site construction. A shape common to cooling towers is the hyperboloid, specifically a single sheet hyperboloid.

Figure 3:
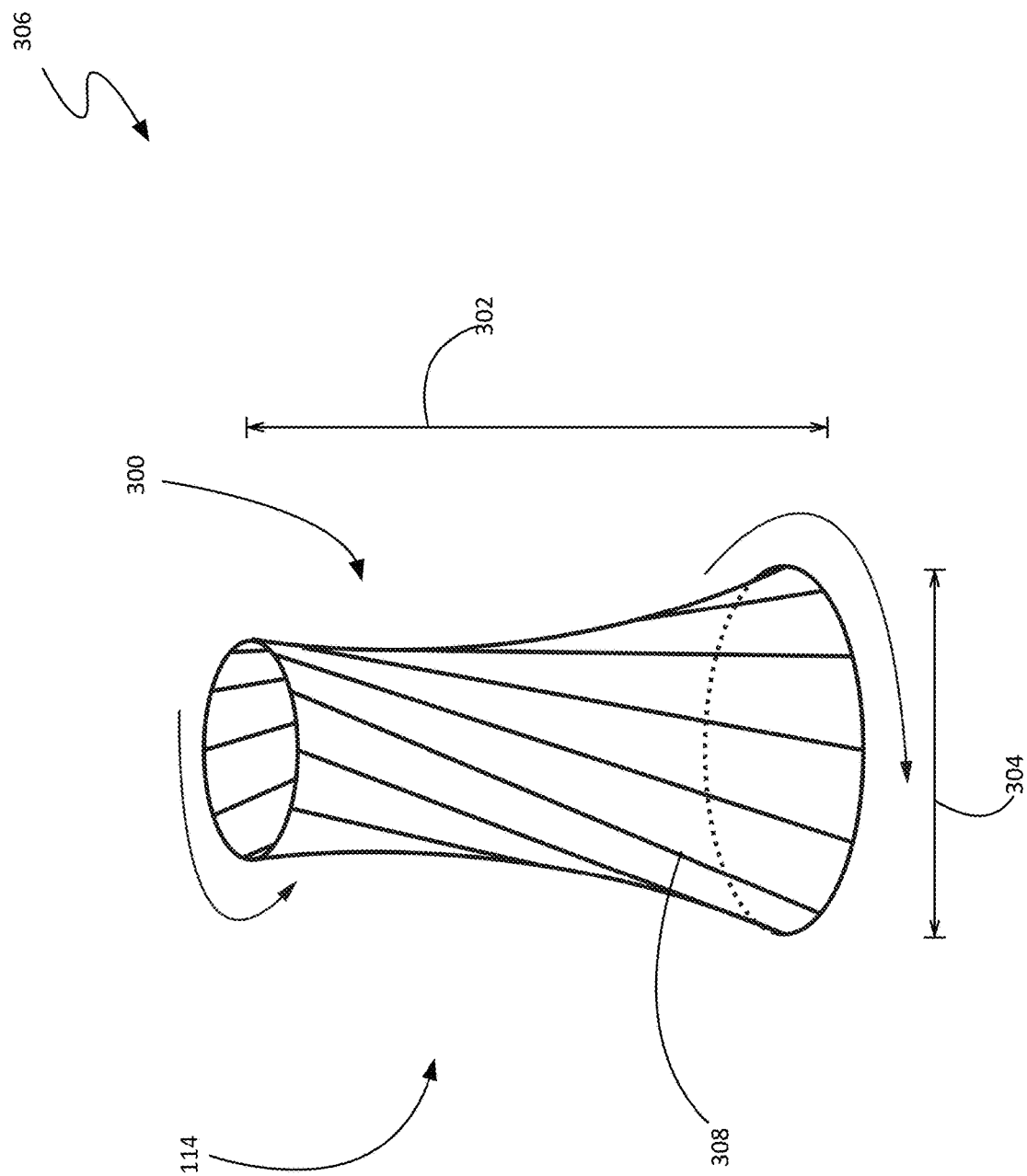
FIG. 3 is a perspective view of a chimney with dynamic geometry.

FIG. 3 shows a perspective view of a non-limiting example of a chimney 306 having a hyperboloid structure 114 and dynamic geometry 300. The hyperboloid structure 114 provides good structural strength using a minimal amount of building material. These shapes also advantageously accelerate the airflow 108 upward as it passes through the narrowed waist. Furthermore, the hyperboloid structure 114 may be constructed using straight members 308, as shown in FIG. 3, rather than requiring curved beams that would be more difficult and expensive to manufacture and transport to the installation site. The hyperboloid shape has benefits that apply to large implementations that are also available when implemented on a much smaller scale.

Like most other implementations of chimneys and towers, in some embodiments, the contemplated chimney 106 geometry may remain fixed. However, in other embodiments, the chimney 306 size and shape may be dynamic. In the context of the present description and the claims that follow, a chimney 306 having a dynamic geometry 300 comprises at least one structural attribute (e.g., height 302, width 304, etc.) that can be modified after the chimney 306 has been manufactured.

As a specific example, the chimney 306 shown in FIG. 3 shows two arrows indicating directions of relative rotation. Rotating the openings of this chimney 306 relative to each other will cause the mouths to expand or contract (e.g., width 304) and the chimney 306 to grow taller or shrink (e.g., height 302), assuming the rigid straight members 308 are coupled to each other with a material that is deformable or elastic, or with a structure or framework that is configured to expand and contract as needed. Other embodiments may comprise chimneys 306 with dynamic geometry 300 that operate on other principals or having other shapes.

Such a dynamic chimney 306 may be advantageous for use in environments with wildly changing conditions, because changing the height 302/width 304 of a hyperboloid chimney 306 directly impacts the speed and volume of air moving through it. A change in shape may be a very energy efficient way to adjust the speed of the airflow 108 in response to a change in an environmental condition 128 (e.g., temperature, humidity, exposure to sunlight, etc.). In other embodiments, a dynamic geometry 300 such as these may be mass produced, which would provide better quality at a lower cost, and still allow a chimney 306 to be fine-tuned at installation to induce an airflow 108 ideal for a particular capture structure 104 having a particular sorbent material 110 operating at a particular location.

Figure 4:
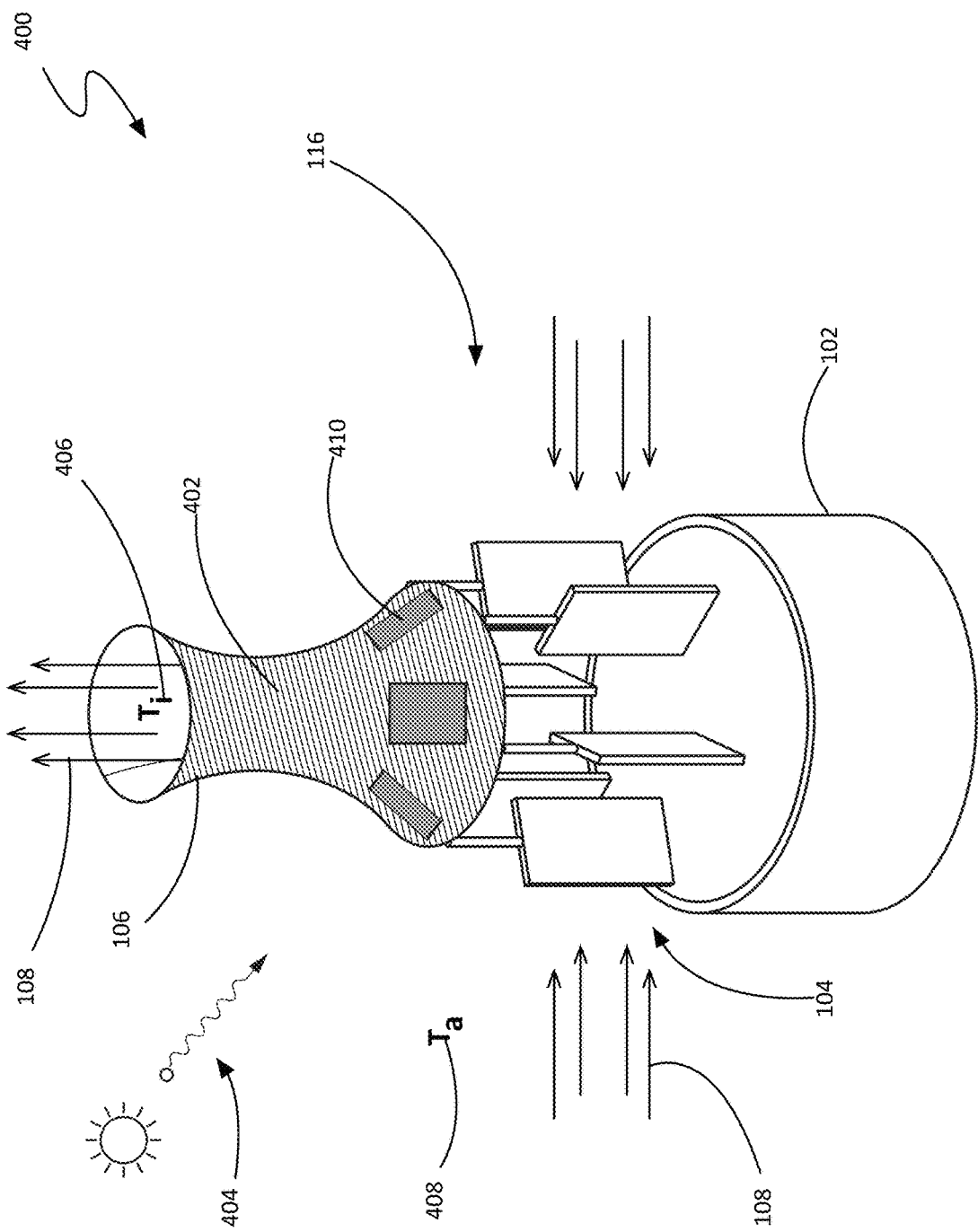
FIG. 4 is a perspective view of a carbon dioxide collection system using solar heating.

FIG. 4 is a perspective view of a non-limiting example of a carbon dioxide collection system 400 using solar heating. As previously mentioned, the advantages the contemplated system 100 offers over conventional DAC systems stem from the airflow 108 induced by the chimney 106. The airflow 108 is caused, at least in part, by the temperature differential between the air inside the chimney 106 and the air outside. Thus, that airflow 108 may be improved by increasing the difference in temperature. According to various embodiments, the construction material of the chimney 106 may be highly heat-conductive to enhance airflow 108 further. According to various embodiments, a chimney 106 may comprise a heating material 402 configured to absorb solar radiation 404 and heat the chimney 106 such that the air temperature 406 inside the chimney 106 is greater than the ambient air temperature 408 outside the chimney 106.

In some embodiments, the outside of the chimney 106 may be colored or otherwise coated with a heating material 402 to enhance the airflow 108 through the temperature differential. In the context of the present description and the claims that follow, a heating material 402 is a material having properties to assist with heating the chimney 106, whether through absorbing solar radiation 404 or through other means.

According to various embodiments, application of solar photovoltaic (PV) panels 410 to the chimney's exterior may also be helpful to provide electrical energy to power various aspects of the system 400. As an option, the system 400 may still be connected to a local power grid for back-up power. In some embodiments, since the airflow 108 does not require any power, the majority, if not all, of electricity consumed by the system 400 may be for regeneration and compression. Implementation of solar panels 410 could reduce the energy costs and balance the energy consumption, though solar may not be appropriate for all environments. Attachment of solar panels 410 to the chimney's exterior could increase the solar panel 410 efficiency and life span of the photovoltaic cells as the airflow 108 cools the panels. Furthermore, solar panels 410 may add heat at strategic locations to enhance the airflow 108 like the previously discussed heating material 402.

Figure 5:
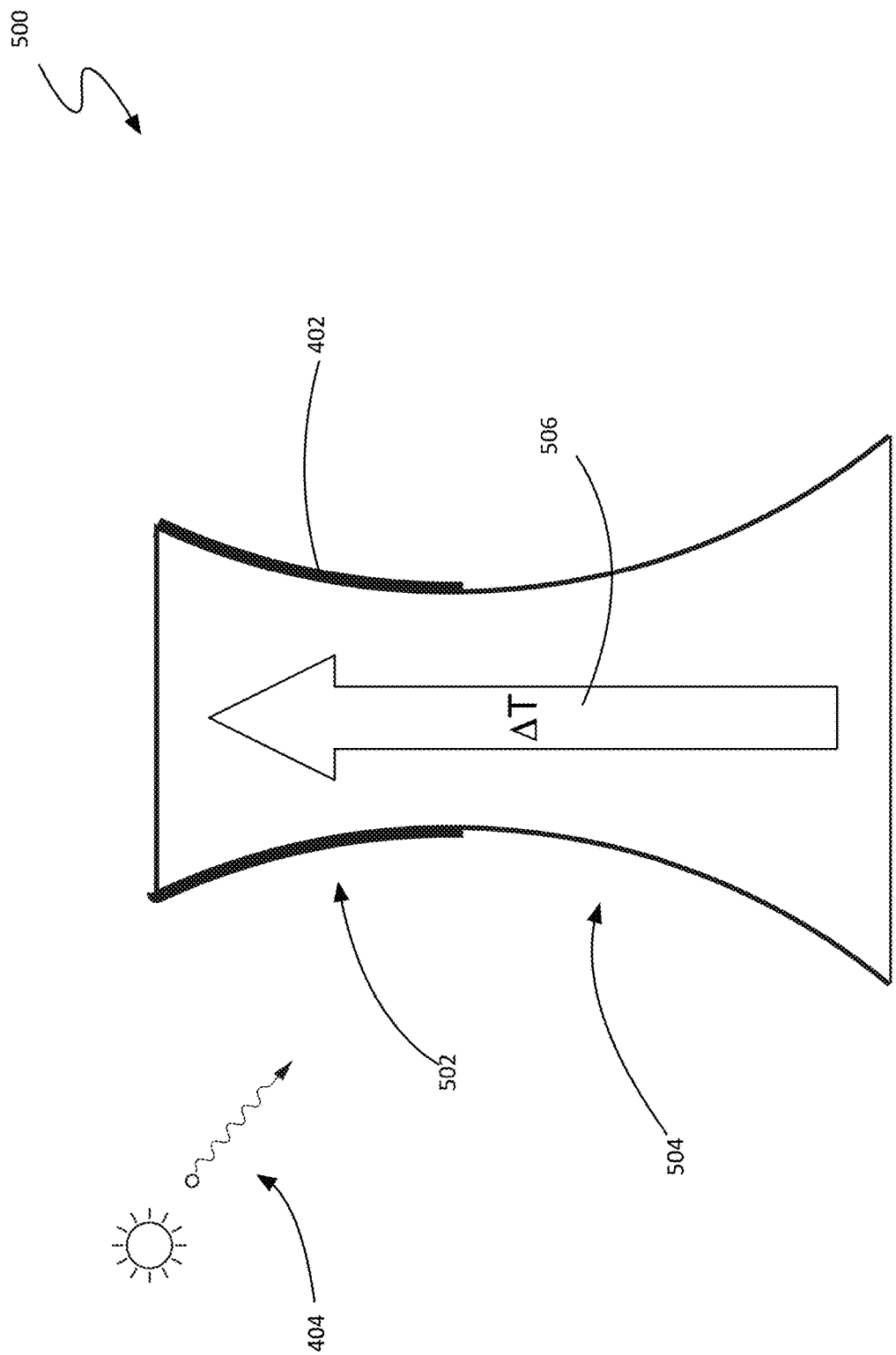
FIG. 5 is a cross-sectional view of a chimney using a heating material to create a thermal gradient.

FIG. 5 is a cross-sectional view along the central axis 118 of a non-limiting example of a chimney 500 using a heating material 402 to create a thermal gradient 506. According to various embodiments, heating material 402 (e.g., black paint, etc.) may be used to heat some portions of the chimney 500 and/or cooling material (e.g., white paint, etc.) may be used to cool others, creating a thermal gradient 506. As an option, the color coating or other coating materials may be placed in a pattern or a mix of colors and patterns to achieve the desired heat and airflow 108. In some embodiments, an upper portion 502 of the chimney 106 may be coated with a heating material 402 so the upper portion 502 absorbs more solar radiation 404 than the lower portion 504, creating a thermal gradient 506 that acts like the fan in an induced mechanical draft cooling tower, which produces an exit air velocity that is higher than the entrance air velocity, enhancing the overall airflow 108 through the capture structure 104.

In some embodiments, the sorbent regeneration media 210 (e.g., water, vapor, liquid, gas, etc.) may use the collected heat to speed up the regeneration process, leading to a quicker harvest and shortened collect/release cycle. As a specific example, in one embodiment, a thin tank full of regeneration media 210 or other fluid may line the chimney 106 to capture heat for use in the sorbent regeneration system 202. In another embodiment, the lower portion 504 of the outside of the chimney 106 may have tubes that heat and deliver water for use by the regeneration process while also shuttling away heat from the lower portion 504 of the chimney 106, enhancing the thermal gradient 506.

Some embodiments of the system 500 may use the most energy-promising sorbent material 110/release mechanism, moisture-swing. However, with the addition of heat gathered from the chimney 500, thermal-swing materials might be equally attractive and avoid the typical associated external heating costs. In some embodiments, the heat may also be used to increase the storage efficiency of the captured $CO_2$.

In one embodiment, the temperature of the chimney 500 may be manipulated to improve the airflow 108 by positioning a portion of the system 100 below grade to create additional temperature differential. In another embodiment, a hillside might be used to take advantage of natural flows of air to passively achieve a greater flow of air through the sorbent, thus "speeding-up" capture. The achievement of an increased airflow 108 to allow the sorbent to have the opportunity to capture more $CO_2$, coupled with a sorbent material 110 that has a capture absorption rate that is matched to the airflow 108, can lead to greater output. Faster capture and harvest reduces the equipment cost per ton of $CO_2$.

FIG. 6 shows a non-limiting example of a portion of a capture structure 600. Specifically, it shows half of a rack structure to which sorbent materials 110 would be attached. According to various embodiments, this rack could be lifted up for exposure to the airflow 108, and then lowered into the release enclosure 102 for harvest. According to various embodiments, this rack-based geometry could be used inside and outside the chimney 106. In some embodiments, it may be roughly the size of the bottom of the chimney 106, having a radius 122 and separated from the chimney 106 by a height 302, as shown in FIGS. 1B and 1C. In some embodiments, the capture structure 104, release enclosure 102, and the chimney 106 may all share the same central axis 118. Other embodiments may have less symmetry, due to the specific environment where it is to be installed.

Figure 7:
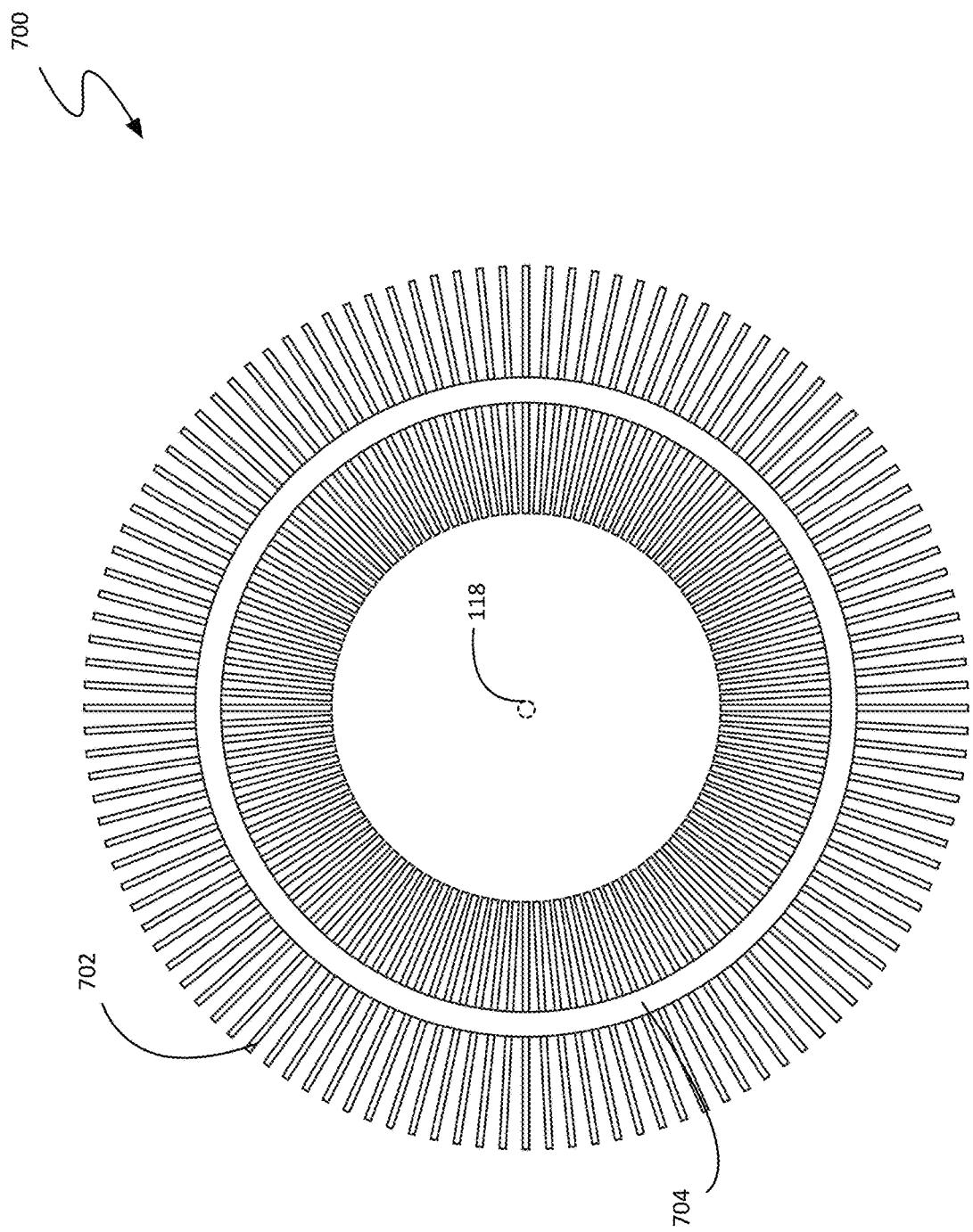
FIG. 7 is a top view of a capture structure with a capture rack.
Figure 9:
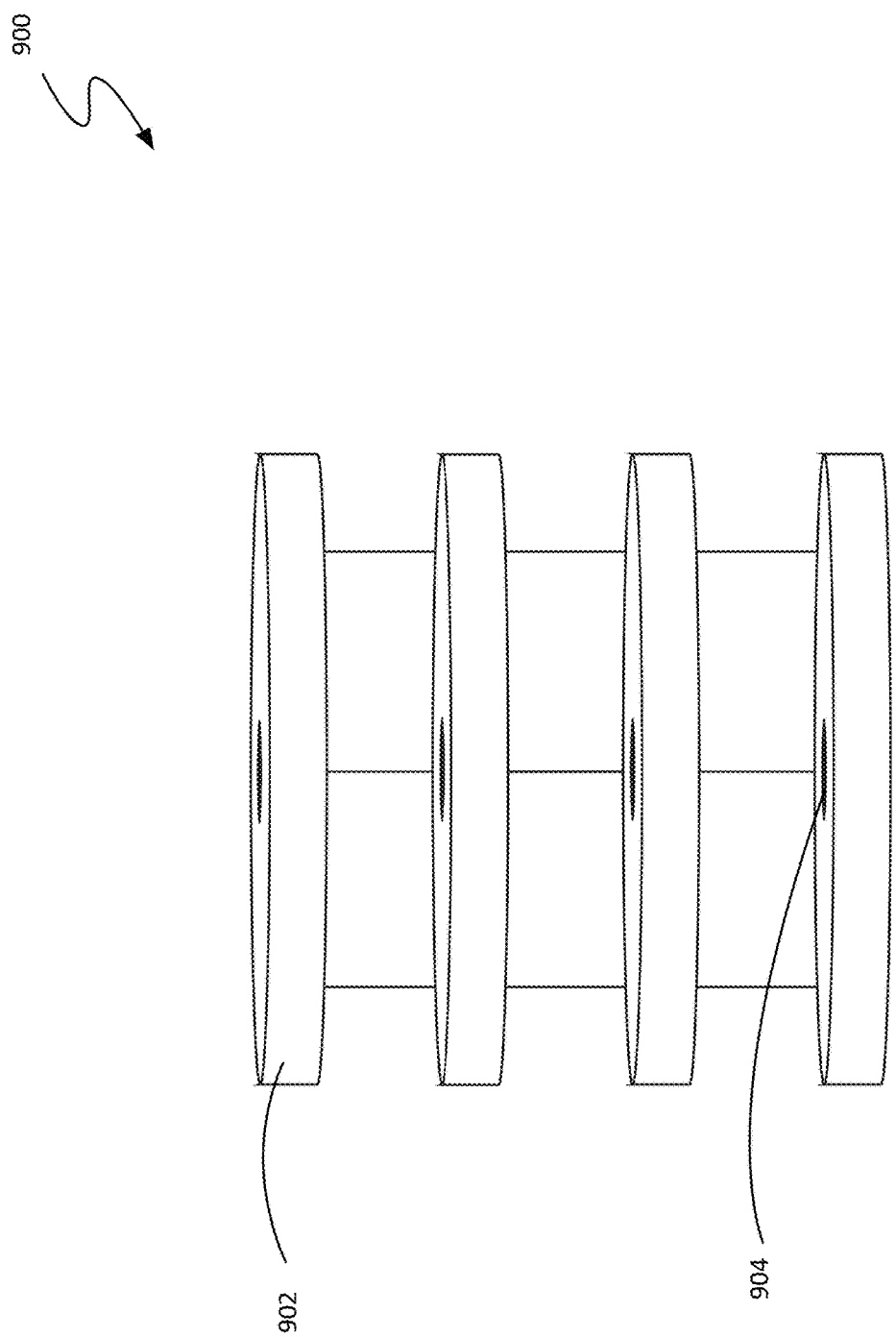
FIG. 9 is a side view of a capture structure with a plurality of disks.

According to various embodiments, the capture structure 104 comprises some sort of structure configured to support and arrange a sorbent material 110 such that is has efficient exposure to the airflow 108 during collection and the regeneration media 210 during release. There are numerous ways a sorbent material 110 may be attached to a structure such as the rack shown in FIG. 6. FIGS. 7-9 show non-limiting examples of three different arrangements, which will be discussed below. It should be noted, however, that there are many other ways the sorbent material 110 may be supported. Those skilled in the art will recognize that the capture structures 104 being discussed here may be adapted for use with a wide range of materials, and that the contemplated system 100 may comprise capture structures 104 adapted from other DAC devices known in the art, both passive and active.

FIG. 7 is a top view of a non-limiting example of a capture structure 700 having a plurality of sorbent panels 702 attached to a capture rack 704. As shown, the sorbent panels 702 are oriented radially about a central axis 118 (i.e., the central axis 118 of the capture structure 700). This orientation is ideal as it is able to receive airflow 108 coming from any and all directions as it moves inward and upward through the chimney 106 above. These sorbent panels 702 comprise sorbent material 110. As shown, the capture structure 104 is constructed as an open cylinder, allowing the airflow 108 to move inward and upward freely, after passing through and contacting the sorbent panels 702.

FIG. 8 is a perspective view of another non-limiting example of a capture structure 800, this one having a plurality of horizontal rings 802. The rings are fastened to a collection of columns (not shown) that function like the rack of FIG. 7. In some embodiments, these rings 802 may be porous, allowing air to flow through them and the sorbent material 110 they contain, in addition to contacting the sorbent material 110 on their outer surface. FIG. 9 is a side view of another non-limiting example of a capture structure 900, this having a plurality of horizontal disks 902 with a central hole 904 to allow the airflow 108 to move inward and upward.

Figure 10:
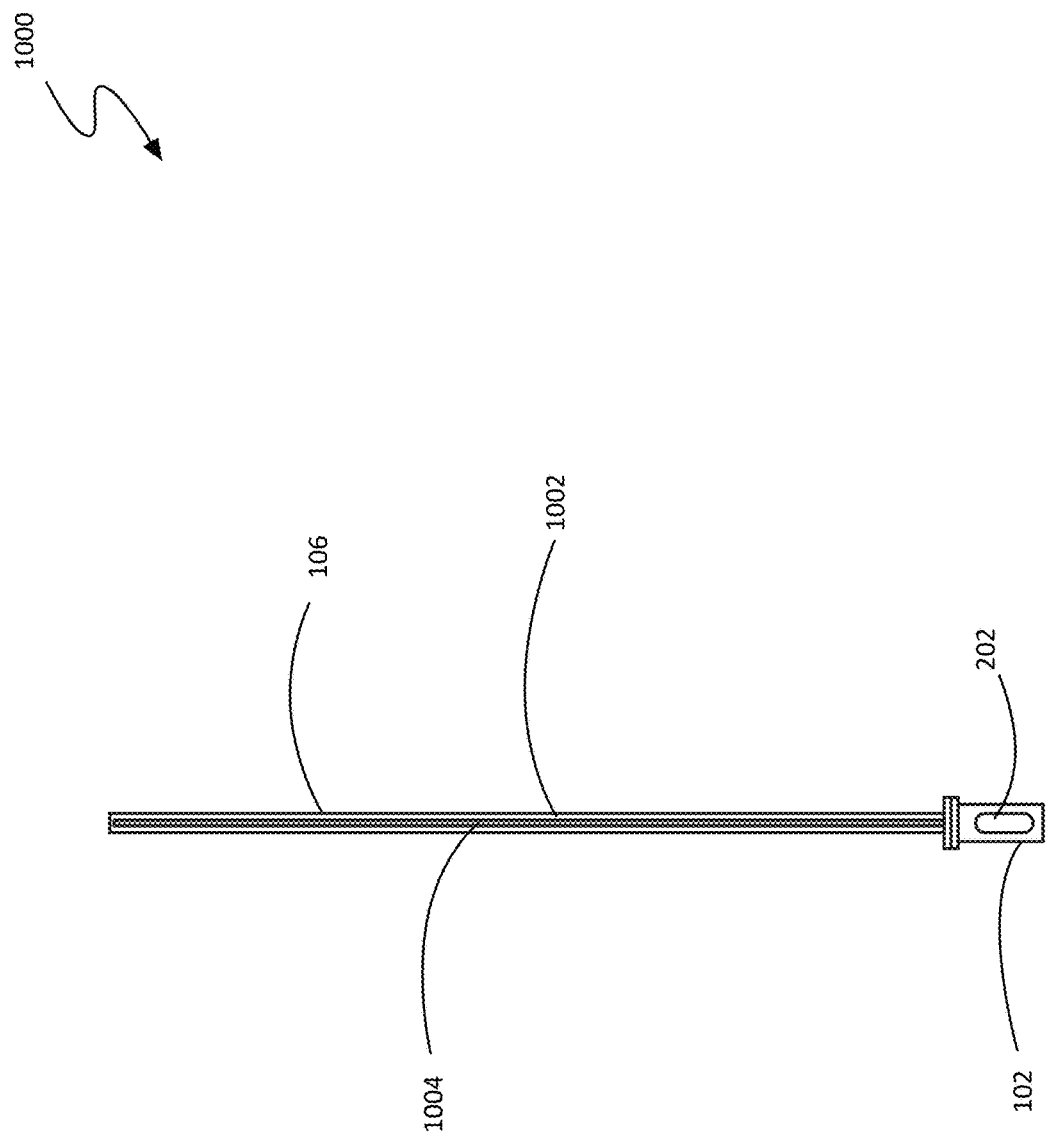
FIG. 10 is a cross-sectional view of a carbon dioxide collection system with an internal capture structure.

As previously stated, in some embodiments, it may be desired to have the sorbent material 110 even closer to the chimney 106 where the airflow 108 may be moving at a speed ideal for that particular set of conditions (e.g., sorbent material 110, environmental conditions 128, air speed, etc.). FIG. 10 shows a non-limiting example of a system 1000 with a capture structure 1002 configured for use inside of a chimney 106. This capture structure 1002 is also able to collect and harvest simultaneously, providing a continuous product stream 216. This is possible because the sorbent material 110 being used is a liquid sorbent 1004 that circulates up and down the capture structure 1002, capturing $CO_2$ from the air as it flows upward through the chimney 106. The $CO_2$-laden liquid sorbent 1004 circulates back down to the release enclosure 102 at the bottom, where the sorbent is regenerated and the carbon dioxide 218 extracted, as is known in the art. In some embodiments, a chimney 106 may have a single capture structure 104 inside of it, while in other embodiments the chimney 106 may have multiple capture structures 104.

Figure 11:
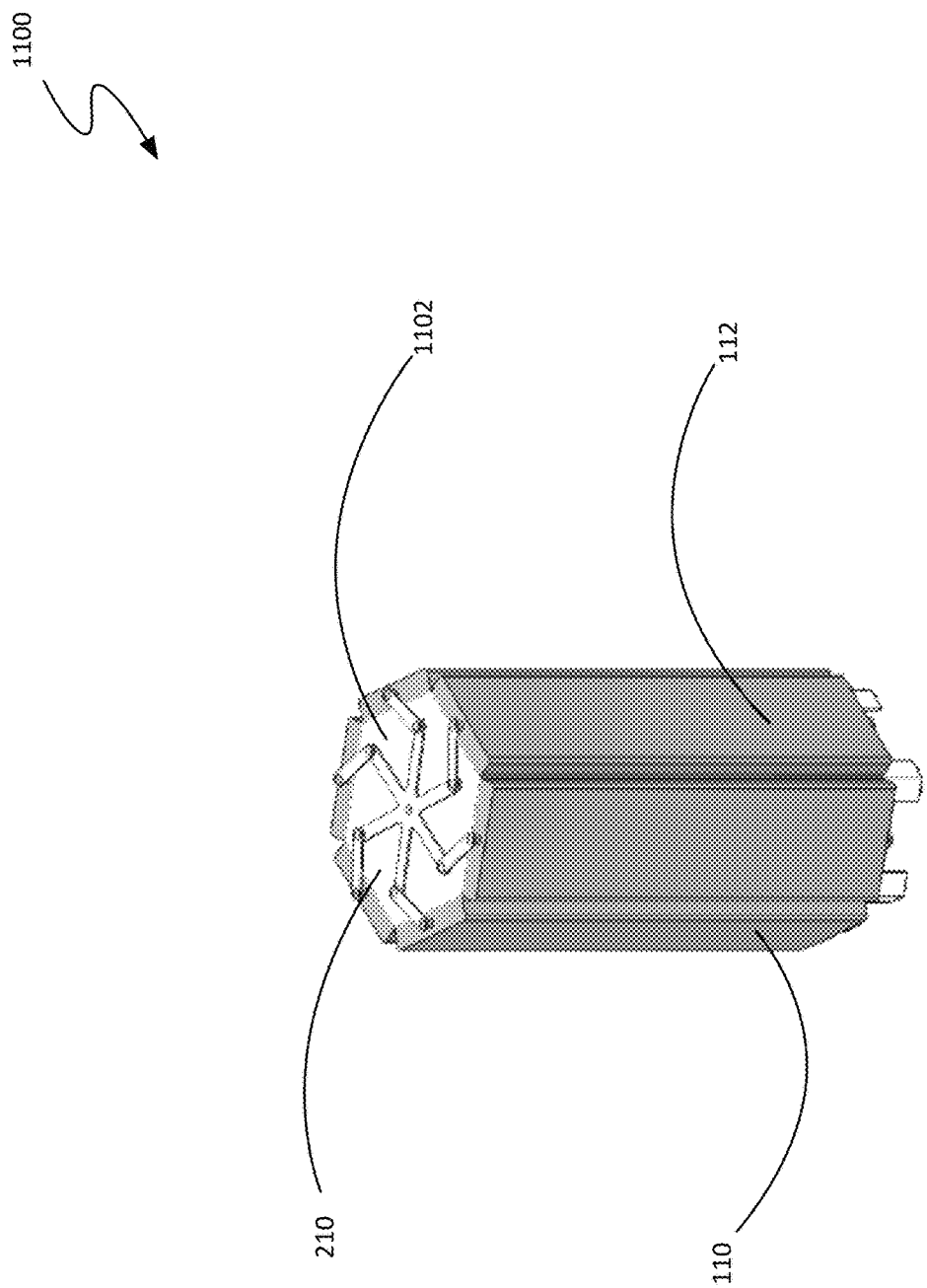
FIG. 11 is a perspective view of an intermittent release enclosure.

FIG. 11 is a non-limiting example of another capture structure 1100 configured for use within a chimney 106. The shaded panels rotate, with one side exposed to the airflow 108 and the other facing inward. The space inside the capture structure 1100 becomes an intermittent release enclosure 1102 after the panels rotate. Laden sorbent lines the walls of the intermittent release enclosure 1102 facing inward. The regeneration media 210 (i.e., heat) causes the $CO_2$ to be released inside the enclosure 1102. As an option, the airflow 108 itself may be used as a sweep gas to move the released $CO_2$ out of the enclosure 1102 and into downstream processing (not shown). The panels then rotate and the cycle continues. This embodiment is somewhere between the batch operation of the panel embodiments and the continuous operation discussed with respect to FIG. 10.

Advantageously, the systems and methods contemplated herein may be adapted for use with any sorbent material 110 able to be regenerated. This flexibility extends the range of operating conditions in which the system 100 may be deployed, in terms of weather and climate. Examples include, but are not limited to, swings based on temperature, pressure, moisture, electrochemical gradient, electricity, and the like. As previously discussed, in some embodiments, heat may be drawn from the chimney 106 to enhance the regeneration process. In some embodiments, the sorbent material 110 may be solid, while in others it may be liquid. Those skilled in the art will recognize that the contemplated system 100 and method may be adapted for use with any form factor these sorbent materials 110 may be given.

It will be understood that implementations are not limited to the specific components disclosed herein, as virtually any components consistent with the intended operation of a method and/or system for passive collection of atmospheric $CO_2$ may be utilized. Accordingly, for example, although particular chimneys, capture structures, sorbent materials, release enclosures, and configurations may be disclosed, such components may comprise any shape, size, style, type, model, version, class, grade, measurement, concentration, material, weight, quantity, and/or the like consistent with the intended operation of a method and/or system for the passive collection of atmospheric $CO_2$ may be used. In places where the description above refers to particular implementations of a system for passive collection of atmospheric $CO_2$, it should be readily apparent that a number of modifications may be made without departing from the spirit thereof and that these implementations may be applied to other passive collection systems.

What is claimed is:

1. A carbon dioxide collection system, comprising:
a release enclosure comprising an opening and a sorbent regeneration system;
a capture structure comprising a plurality of vertical panels oriented radially about a central axis of the capture structure, each vertical panel comprising a sorbent material, the capture structure being movable between a collection configuration and a release configuration;
a chimney having a hyperboloid structure and shaped such that an airflow upward through the chimney is created, the chimney positioned above the release enclosure such that the airflow passes through the capture structure before exiting the chimney while the capture structure is in the collection configuration, the chimney comprising a heating material configured to absorb solar radiation such that an air temperature inside the chimney is greater than an ambient air temperature outside the chimney;
at least one solar panel coupled to the chimney; and
a product outlet in fluid communication with the inside of the release enclosure and configured to emit a product stream of enriched fluid;
wherein the collection configuration comprises the capture structure elevated above the release enclosure such that the sorbent material of the capture structure is exposed to the airflow generated by the chimney, allowing the sorbent material to capture carbon dioxide from the airflow; and
wherein the release configuration comprises the capture structure being sufficiently enclosed inside the release enclosure that the sorbent regeneration system may operate on the sorbent material of the capture structure to release carbon dioxide collected by the capture structure while in the collection configuration to form an enriched fluid within the release enclosure.

2. The carbon dioxide collection system of claim 1:
wherein the collection configuration comprises at least one of the capture structure being separated from the chimney by at least a vertical separation and the sorbent material of the capture structure being distanced from a central axis of the capture structure by at least a radius; and
wherein at least one of the vertical separation and the radius is chosen such that a $CO_2$ capture rate of the sorbent material as arranged in the capture structure is substantially equal to a $CO_2$ exposure rate caused by the airflow passing through the capture structure while the capture structure is in the collection configuration.

3. The carbon dioxide collection system of claim 2, wherein the at least one of the radius and the vertical separation can be modified after the carbon dioxide collection system has been installed, in response to a change in an environmental condition.

4. The carbon dioxide collection system of claim 1, wherein the release enclosure further comprises a lid sized to cover the opening and configured to seal the capture structure inside the release enclosure when in the release configuration.

5. The carbon dioxide collection system of claim 1, wherein the chimney is one of a cooling tower and a smokestack.

6. The carbon dioxide collection system of claim 1, wherein the chimney comprises a dynamic geometry such that at least one of a height of the chimney and a width of the chimney may be modified after manufacture.

7. The carbon dioxide collection system of claim 1, wherein the heating material is confined to an upper portion of the chimney such that the upper portion absorbs more solar radiation than a lower portion of the chimney, thereby creating a thermal gradient to enhance the airflow through the chimney.

8. The carbon dioxide collection system of claim 1, wherein the collection configuration comprises the capture structure being at least partially inside of the chimney.

9. A carbon dioxide collection system, comprising:
 a release enclosure comprising an opening and a sorbent regeneration system;
 a capture structure comprising a sorbent material, the capture structure being movable between a collection configuration and a release configuration;
 a chimney shaped such that an airflow upward through the chimney is created, the chimney positioned above the release enclosure such that the airflow passes through the capture structure before exiting the chimney while the capture structure is in the collection configuration; and
 a product outlet in fluid communication with the inside of the release enclosure and configured to emit a product stream of enriched fluid;
 wherein the collection configuration comprises the capture structure elevated above the release enclosure such that the sorbent material of the capture structure is exposed to the airflow generated by the chimney, allowing the sorbent material to capture carbon dioxide from the airflow; and
 wherein the release configuration comprises the capture structure being sufficiently enclosed inside the release enclosure that the sorbent regeneration system may operate on the sorbent material of the capture structure to release carbon dioxide collected by the capture structure while in the collection configuration to form an enriched fluid within the release enclosure.

10. The carbon dioxide collection system of claim 9, wherein the capture structure comprises a plurality of vertical panels oriented radially about a central axis of the capture structure, each vertical panel comprising the sorbent material.

11. The carbon dioxide collection system of claim 9:
 wherein the collection configuration comprises at least one of the capture structure being separated from the chimney by at least a vertical separation and the sorbent material of the capture structure being distanced from a central axis of the capture structure by at least a radius; and
 wherein at least one of the vertical separation and the radius is chosen such that a $CO_2$ capture rate of the sorbent material as arranged in the capture structure is substantially equal to a $CO_2$ exposure rate caused by the airflow passing through the capture structure while the capture structure is in the collection configuration.

12. The carbon dioxide collection system of claim 11, wherein the at least one of the radius and the vertical separation can be modified after the carbon dioxide collection system has been installed, in response to a change in an environmental condition.

13. The carbon dioxide collection system of claim 9, wherein the release enclosure further comprises a lid sized to cover the opening and configured to seal the capture structure inside the release enclosure when in the release configuration.

14. The carbon dioxide collection system of claim 9, further comprising at least one solar panel coupled to the chimney.

15. The carbon dioxide collection system of claim 9, wherein the chimney is one of a cooling tower and a smokestack.

16. The carbon dioxide collection system of claim 9, wherein the chimney is a hyperboloid structure.

17. The carbon dioxide collection system of claim 9, wherein the chimney comprises a dynamic geometry such that at least one of a height of the chimney and a width of the chimney may be modified after manufacture.

18. The carbon dioxide collection system of claim 9, wherein the chimney comprises a heating material configured to absorb solar radiation such that an air temperature inside the chimney is greater than an ambient air temperature outside the chimney.

19. The carbon dioxide collection system of claim 18, wherein the heating material is confined to an upper portion of the chimney such that the upper portion absorbs more solar radiation than a lower portion of the chimney, thereby creating a thermal gradient to enhance the airflow through the chimney.

20. The carbon dioxide collection system of claim 9, wherein the collection configuration comprises the capture structure being at least partially inside of the chimney.

* * * * *